H. HOLT.
FOLDING AND DETACHABLE CAR OR CARRIAGE FOR USE WITH CYCLES OR MOTOR CYCLES.
APPLICATION FILED MAY 6, 1912.
1,047,226.
Patented Dec. 17, 1912.
3 SHEETS—SHEET 1.
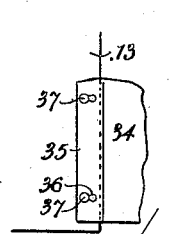
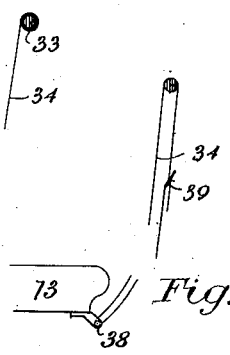
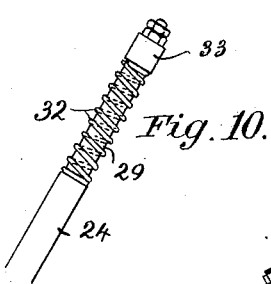
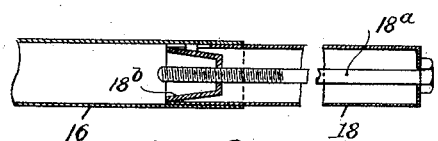
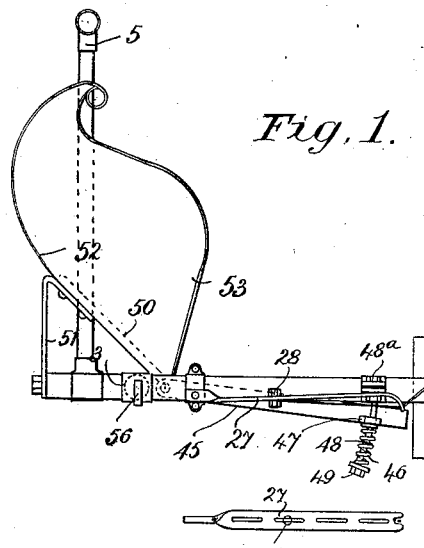
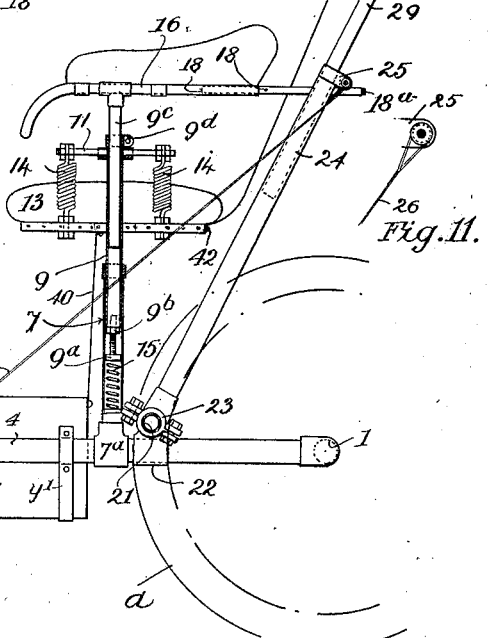
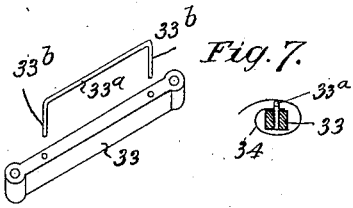

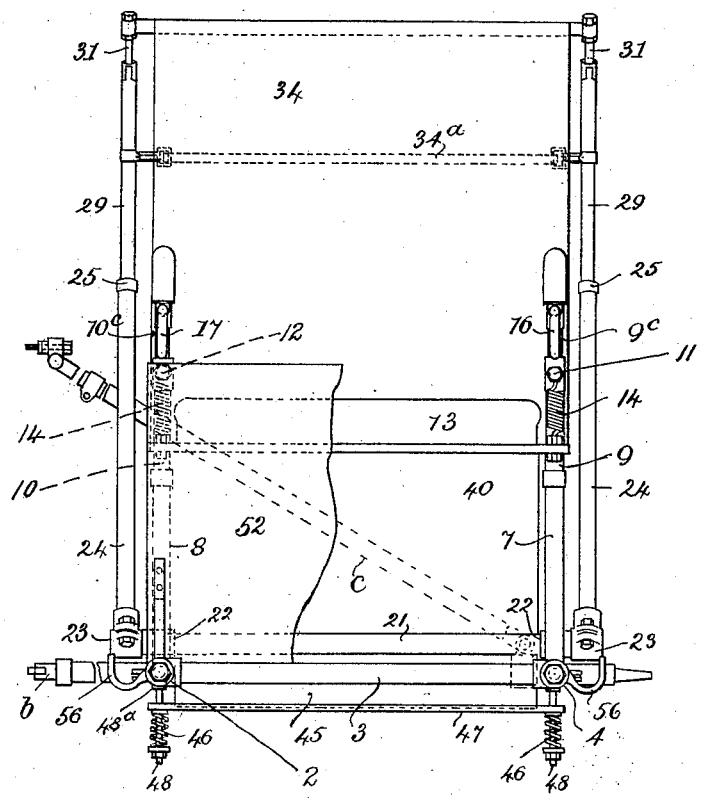
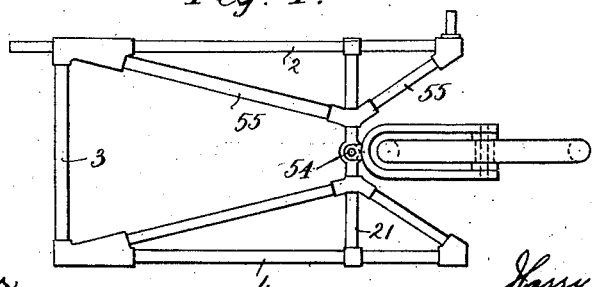

H. HOLT.
FOLDING AND DETACHABLE CAR OR CARRIAGE FOR USE WITH CYCLES OR MOTOR CYCLES.
APPLICATION FILED MAY 6, 1912.
1,047,226.
Patented Dec. 17, 1912.
3 SHEETS—SHEET 3.
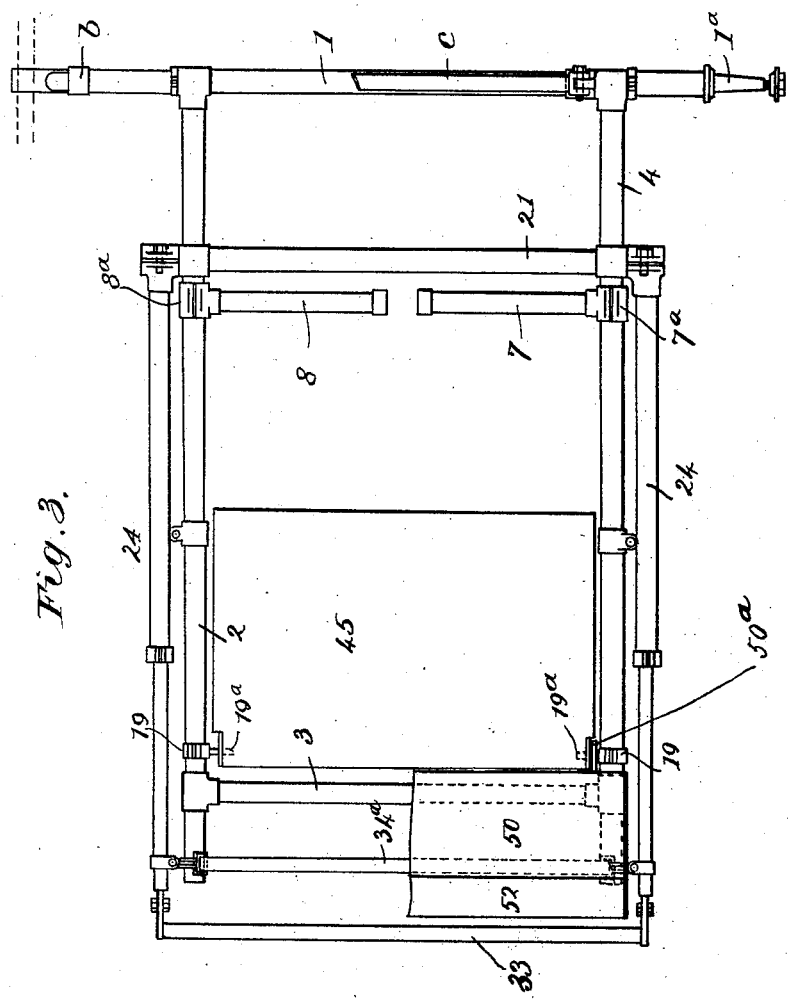

UNITED STATES PATENT OFFICE.

HARRY HOLT, OF LEAMINGTON SPA, ENGLAND.

FOLDING AND DETACHABLE CAR OR CARRIAGE FOR USE WITH CYCLES OR MOTOR-CYCLES.

1,047,226. Specification of Letters Patent. Patented Dec. 17, 1912.

Application filed May 6, 1912. Serial No. 695,515.

*To all whom it may concern:*

Be it known that I, HARRY HOLT, cycle and motor engineer, a subject of the King of England, residing at 68ª Regent street, Leamington Spa, Warwickshire, England, have invented certain new and useful Improvements in and Relating to Folding and Detachable Cars or Carriages for Use with Cycles or Motor-Cycles; and I do hereby declare the following to be a full, clear, and exact description of the invention, such as will enable others skilled in the art to which it appertains to make and use the same.

The invention relates to cars or carriages for use with cycles or motor cycles and has for its object to provide a car of the kind in which the ground wheel is disposed either at the outside or centrally thereof, of improved construction which can be quickly and easily folded into small space and which when not being employed for passenger use may be employed for the carriage of goods.

The invention is especially applicable as a side car for motor cycles.

The invention comprises a base frame upon which is pivotally and adjustably mounted a back supporting member, said frame also having seat supporting members, adapted to carry in use a detachable spring supported seat, said back and seat supporting members being capable of being folded or collapsed when out of use. The said back supporting member is provided with a suitable back or rest which may be of flexible material detachably secured to the seat while the upper part is adjustably and resiliently mounted upon said back supporting member. The base frame is provided with a suitable foot rest which is preferably mounted so as to have a resilient pivotal movement and at the front part of said foot board is provided an inclined shield or dash board.

The accompanying drawings illustrate a side car made in accordance with the invention.

Figure 1. is a side view arranged for passenger use. Fig. 2. is a front view. Fig. 3. is a plan with the parts collapsed. Fig. 4. is a part plan to a smaller scale of a modification. Figs. 5 and 6. are details. Figs. 7 and 8 are further details. Figs. 9, 10 and 11 are further details.

Figs. 1, 2, and 3 show a car in which the ground wheel is disposed at the outside of the frame, and comprises a rectangular base frame formed of tubular members 1, 2, 3, and 4.

The rear cross member 1 is extended on the outer side as at 1ª, and adapted to receive the wheel $a$ while the opposite end is also extended and provided with a suitable fastening as at $b$ for securing same to the motor cycle framing and the said member 1 also carries the usual inclined coupling member $c$.

The carriage may be connected to the cycle by any approved coupling devices, and the cycle is not shown in the drawings as it is of any approved make and does not form any part of the present invention.

Upon the side members 2 and 4, somewhat toward the rear thereof, are disposed two hollow members 7 and 8 mounted by means of split collars 7ª and 8ª, whereby they may be turned about the frame members in either vertical or horizontal position; said split collars also serving to allow of the pillars 7 and 8 being adjusted to any desired position along the members 2 and 4. When in the vertical position as shown in Figs. 1 and 2, these members 7 and 8 are adapted to receive telescopically, pillars 9 and 10 which are secured at their upper ends to cross bars 11 and 12 which support the seat 13 at each end by suspension springs 14 pivotally secured at the ends of the said bars 11 and 12. The pillars 9 and 10 are carried in the members 7 and 8 upon springs 15 disposed therein, said members 7 and 8 being plugged or closed at their lower ends so as to form a seating for the said springs. For the purpose of allowing the height of the seat to be adjusted, and taking up loss in the length of the spring, due to compression, the lower ends of the pillars 9 and 10 are provided with a head 9ª screwed into the closed ends of the said pillars, and adapted to be locked in desired position by a lock nut 9ᵇ.

By pivotally mounting the seat supporting springs upon the telescopic pillars 9 and 10, said pillars are free to move easily under the weight of the rider without jamming, in the event of the seat taking a position more or less out of the horizontal, due to the unequal distribution of the weight.

The pillars 9 and 10 have adjustable telescopic extensions 9ᶜ and 10ᶜ provided with horizontal arm supporting members 16 and 17 suitably upholstered as shown and adjustable in height by means of similar split collars 9ᵈ. The rear ends of the arm members 16 and 17 are made adjustable as to length by means of the telescopic connection 18, secured by bolt 18ᵃ and taper plug 18ᵇ as shown in Fig. 9.

21 is a tubular cross bar secured by suitable sockets pieces 22 upon the base frame members 2 and 4, the ends of which crossbar project beyond said members 2 and 4. Upon these projecting ends are mounted, by means of split clamping lugs 23, two back members 24 capable of being adjusted to any desired angle for supporting the back of the passenger or to be turned down when out of use to a substantially horizontal position as indicated in Fig. 3. The rearward ends of the arm supports 16 and 17 are adapted to project past the said back supporting members 24 whereby any side strain caused by the weight of the passenger in steering around corners or the like is taken by the said back supporting members. The upper parts of the back members 24 are provided with lugs 25 to which front cable stays 26 are secured on pulley wheels Fig. 11. The forward ends of the stays 26 are adjustably secured to slotted plates 27 27 (Fig. 8) mounted upon the members 2 and 4 of the base frame said stays 26 being passed under the recessed ends of the plates 27 and secured in the desired slot by a bolt 28. Within the back members 24, at the upper ends, are telescopically disposed rods 29 adapted to be adjusted as regards height and secured by the clamping lugs 25. The upper parts of said rods 29 are bent rearwardly at 30.

31 31 are links pivoted to the parts 30, springs 32 being provided to resiliently support said links from the ends of the rods 29. A cross bar 33 is secured upon the ends of the links 31. 34 is a length of canvas or the like, the upper end of which is secured by being passed between the cross bar 33 (Fig. 7) and a detachable clamping member 33ᵃ, said length of canvas having eyelet holes for the reception of the parts 33ᵇ. The lower end is adapted to be detachably fastened to the under part of the seat 13. This is shown in Fig. 5 in which the edge of the canvas 34 is strengthened by a metal strip 35 having bayonet slots 36 which co-act with lugs or pins 37 upon the seat. The canvas back 34 is adapted to be correspondingly adjusted in relation with the cross bar 33 in any suitable way. For instance in Figs. 1 and 5 and 7 the upper part is adapted to be coiled around said cross bar and wound up thereon or unwound as required. In another case, shown in Fig. 6, the seat may be provided with a bar or roller 38 and the canvas passed thereover, and over the cross bar 33, the two ends being detachably secured together by straps and buckles 39. A flexible cross member or detachable strap 34ᵃ is provided adapted to be adjusted in suitable position between the members 24, to afford an additional support for the back, and to serve as a safeguard against accident should the canvas 34 part or break from any cause. In a modification the cross bar 23 may be slidably mounted upon reduced straight extensions of the members 29 (see Fig. 10) spiral springs 32ᵃ being disposed as shown.

A box or receptacle for tools or the like, such as y may be slung between the frame members 2 and 4 by straps y'. The upper surface of the box may also serve for carrying spare cans of gasolene or a child's seat may be mounted thereon.

40 is a length of canvas or the like adapted to be secured between the seat 13 and the tool box y by press buttons 42 to form a shield or guard at the rear of the passenger's legs.

The foot board 45 comprises a rectangular piece of wood or the like, pivotally mounted at about its forward edge in extensions 19ᵃ of the lugs 19, and is supported at its opposite edge upon springs 46 by means of a plate or bar 47, the ends of which are adapted to move over curved rods 48, secured to lugs 48ᵃ upon the base frame. The springs 46 are mounted upon these rods and secured in position by nuts 49.

At the front edge of the foot board 45 is disposed an inclined dash board 50 which forms an extension of said foot board. The forward end of said member 50 is secured by supports 51 mounted upon the ends of the side framing 2 and 4, while the rear edge is provided with holed plates 50ᵃ through which the extensions 19ᵃ are passed. The board is formed with a curved metal screen 52 secured to side piece 53.

Fig. 4 shows how the invention may be applied to that type of side car in which the ground wheel is situated centrally thereof instead of to one side. In this form the rear cross member of the base frame is dispensed with, and a boss 54 is secured in position between stays such as 55 upon the before mentioned cross bar 21, and the ground wheel is pivotally mounted caster fashion, to the boss 54 in any suitable known manner, so as to trail and adapt itself to the direction of the motion.

The dismantling of the car is accomplished as follows:—The canvas back 34 is first detached along its lower edge and rolled upon the cross bar 33, or can be removed entirely, and the leg portion 40 is detached by unfastening the press buttons. The arms 9ᶜ 9ᵈ are withdrawn from members 9, 10 and the seat 13, together with the springs, cross bars 11 and 12 and the members 9 and 10 are now removed from the members 7 and 8 whereupon the pillars 9 and 10 can be snugly folded on to the seat by turning them about the bars 11 and 12. The loose springs 15 are also removed from the seat carrying members 7 and 8 to prevent same becoming lost whereupon said members 7 and 8 may be turned inwardly to a horizontal position, and there secured as shown in Fig. 3. The clamping lugs 23 are released whereby the back members 24 may be turned downwardly as shown in Fig. 3 suitable hooks or recesses 56 being provided to support them when in this position.

It will thus be seen that by the use of the invention a passenger side car is obtained which can be quickly folded or collapsed into a small space when not required, whereby the parts may be protected from dust and wet in the collapsed or folded position, the device may be conveniently employed for the carriage of goods either by placing the goods directly thereon and securing same by a strap or the like, or a box or the like may be mounted upon the said frame. For instance a box or the like receptacle may be provided at opposite sides with loops or hollow clips adapted to fit inside or over the pillars 7 and 8 which would be kept in the vertical position, the forward part of said box resting upon the foot board 45. The method of securing the box or container would vary according to different requirements. Further by mounting the back portions between resilient means and the seat, the combined movement of both the back and seat under the weight of the rider, prevents friction or rubbing between the rider's clothes and said back, and thus great comfort is obtained, and by reason of the upper part of the back rest being adjustable, the said back may be easily and quickly arranged to suit persons of varying stature.

Having described my invention what I claim as new and desire to procure by Letters Patent is:—

1. In a collapsible carriage, the combination, with a base-frame provided with telescopic side members, and coupling devices for connecting the base-frame to a cycle; of a road wheel for carrying the base-frame, laterally-foldable seat-supports pivoted to the said side members, a detachable seat, and means for suspending the seat from the seat-supports when in their raised positions.

2. In a collapsible carriage, the combination, with a base-frame provided with telescopic side members, and coupling devices for connecting the base-frame to a cycle; of a road wheel for carrying the base-frame, laterally-foldable seat-supports pivoted to the said side members, a detachable seat, springs and connections for suspending the said seat from the said seat-supports when in their raised positions, a longitudinally-foldable back-support pivoted to the base-frame, a back of flexible material having its lower end connected to the said seat, a spring connection between the top of the back and the top of the back-support, and means for holding the back-support in a raised position.

3. In a collapsible carriage, the combination with a base-frame provided with coupling devices for connecting it to a cycle, of a road wheel for carrying the base-frame, laterally-foldable telescopic seat-supports pivoted to the base-frame, crossbars secured to the upper end portions of the seat-supports, a seat, springs suspending the seat from the said crossbars, and removable arm-supports provided with supporting rods which engage with the upper end portions of the seat-supports.

In testimony whereof I affix my signature, in presence of two witnesses.

HARRY HOLT.

Witnesses:
 SYDNEY R. TAYLOR,
 A. W. WINSALL.

---

Copies of this patent may be obtained for five cents each, by addressing the "Commissioner of Patents, Washington, D. C."